May 19, 1959     E. S. GILCHRIST     2,887,646
TRANSMITTING POTENTIOMETER
Filed Feb. 20, 1958
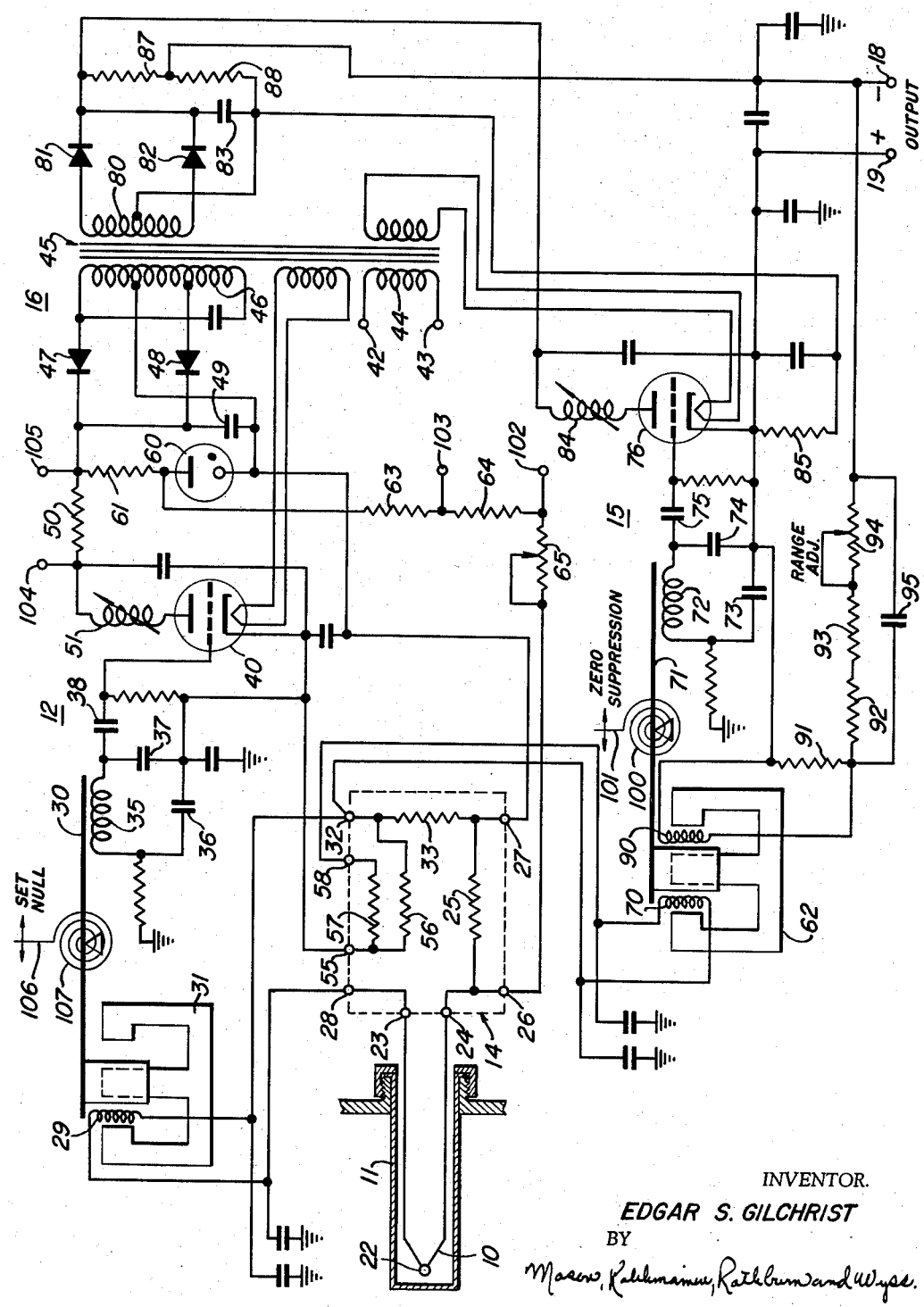
INVENTOR.
EDGAR S. GILCHRIST
BY
ATTORNEYS

United States Patent Office 2,887,646
Patented May 19, 1959

2,887,646

TRANSMITTING POTENTIOMETER

Edgar S. Gilchrist, Fairfield, Conn., assignor to Manning, Maxwell & Moore, Inc., Stratford, Conn., a corporation of New Jersey Application February 20, 1958, Serial No. 716,457

10 Claims. (Cl. 323—64)

The present invention relates to potentiometer type measuring instrument, and, more particularly, to a sensitive measuring instrument which operates on a continuous null balance principle to convert a millivolt level direct current signal into a proportional high level direct current output signal suitable for transmission to a remote point. While the invention is of general application, it is particularly suitable for measurement of thermocouple temperatures and the like. Specifically, the present invention is an improvement of the transmitting potentiometer described and claimed in a copending application of Charles G. Roper, Edgar S. Gilchrist and Arthur J. Sable, Serial No. 579,194, filed April 19, 1956, which is assigned to the same assignee as the present invention.

In many thermocouple installations, the thermocouple is arranged to be inserted into a metallic well and this well is usually electrically connected to ground. Accordingly, when an ungrounded thermocouple is used, one side of the thermocouple may be grounded as the thermocouple is jammed into the well. If the transmitting potentiometer provides a direct electrical connection from the thermocouple input terminals to the output terminals of the transmitting potentiometer, then a ground on one of the output terminals of the transmitter, which may arise either intentionally or accidentally due to grounding of one of the transmission wires to the remote control area, may result in drawing an arc between the thermocouple and the well as it is inserted or withdrawn from the well. In process areas of certain types of industrial processes the drawing of such an arc may cause an explosion or produce other undesirable effects.

It is, therefore, a primary object of the invention to provide a new and improved transmitting potentiometer in which the input measuring circuit of the potentiometer is isolated from the direct current output circuit thereof so that a ground on either side of the output circuit of the transmitting potentiometer does not ground either side of the primary measuring element.

It is another object of the present invention to provide a new and improved transmitting potentiometer in which two electromechanical force balance units are employed to provide direct current isolation between the input and output of the potentiometer and, at the same time, there is provided a transmitting potentiometer having an improved rate of response and the ability to function properly with thermocouple leads of substantially increased length.

It is still another object of the present invention to provide a new and improved transmitting potentiometer wherein a pair of electromechanical force balance units are provided to effect direct current isolation between the input and output circuits of the potentiometer, cold junction compensation being provided in the first force balance unit and zero suppression being provided in the second force balance unit.

The invention, both as to its organization and manner of operation, together with further objects and advantages thereof, will best be understood by reference to the following specification taken in conjunction with the accompanying drawing in which:

The single figure of the drawing is a schematic diagram of a transmitting potentiometer embodying the principles of the present invention.

Referring now to the drawing, the present invention is therein illustrated as comprising a thermocouple 10 which is adapted to be inserted in a metallic well 11, an error detector indicated generally at 12, a replaceable range card unit indicated generally at 14, a zero suppression and isolating amplifier unit indicated generally at 15, and a power supply unit indicated generally at 16.

Generally considered, the error detector 12 includes an electromechanical force balance unit which is employed in conjunction with an electrical oscillator to detect the potentiometer error signal and develop an intermediate direct current signal which is compensated for the thermocouple cold junction but includes no zero suppression. This intermediate direct current signal is supplied to the unit 15 which also includes an electromechanical force balance unit and is employed to provide zero suppression and also isolates the thermocouple input circuit from the output terminals 18 and 19 of the transmitting potentiometer insofar as direct current is concerned. The unit 15 provides a direct current output signal which preferably has a range of from 1.0 to 5.0 milliamperes over the desired temperature range and this direct current output signal may be transmitted by means of transmission lines connected to the terminals 18 and 19 (not shown) to suitable indicators, recorders or controllers of a process control system such as described in detail in a copending application of C. G. Roper and E. S. Gilchrist, Serial No. 389,564, filed November 2, 1953, which is assigned to the same assignee as the present invention. The power supply unit 16 provides a stabilized reference voltage for the electromechanical force balance unit 12 to provide cold junction compensation. However, the zero suppression facilities are provided mechanically in the electromechanical force balance unit 15, as will be described in more detail hereinafter.

Considering first the circuit arrangement of the error detector 12, the hot junction 22 of the thermocouple 10 is connected to the terminal 23 on the range card 14, and the cold junction 24 of this thermocouple is connected to a cold junction compensation resistor 25 which is itself connected to the terminals 26 and 27 of the range card 14. The terminal 23 is internally connected to the terminal 28 on the range card 14 and the terminal 28 is connected to one side of an error detector coil 29 which is mounted on one end of a pivotally supported beam 30, the coil 29 being mounted in the field of a permanent magnet structure 31. The other end of the coil 29 is connected to the terminal 32 on the range card 14 and the terminal 32 is connected internally through the feedback resistor 33 on the range card 14 to the terminal 27 thereof.

An oscillator coil 35 is positioned adjacent the opposite end of the beam 30 and is connected in series with condensers 36 and 37 to form an oscillator tank circuit, the tank circuit voltage being coupled through the condenser 38 to the control grid of an oscillator tube 40. Conventional power plant alternating current is supplied to the power terminals 42 and 43 of the transmitting potentiometer, these terminals being connected to an input winding 44 on the power transformer 45. The alternating current voltage developed across the winding 46 of the power transformer 45 is rectified by means of the rectifiers 47 and 48 and is filtered by means of the filter condenser 49 to provide a unidirectional supply voltage for the oscillator tube 40. This voltage is connected by way of the null indication resistor 50 and a variable anode load inductance 51 to the anode of the tube 40. The cathode of the tube 40 is connected to the terminal 55 on the range card 14 and a resistor 56 is connected between the terminals 55 and 32 on this range card. A resistor 57 is also connected between the terminal 55 and the terminal 58 of the range card 14 and a direct current signal of intermediate amplitude, which is produced between the terminals 32 and 58 on the range card 14, is supplied to the zero suppression and amplifier unit 15, as will be described in more detail hereinafter.

In order to provide a suitably stabilized unidirectional reference voltage for the cold junction compensation resistor 25, a gaseous discharge voltage regulator tube 60 is connected through a series dropping resistor 61 to the unidirectional supply voltage produced across the condenser 49. The regulated unidirectional voltage provided across the tube 60 is connected through the resistors 63 and 64 and the adjustment potentiometer 65 to the input terminals 26 and 27 of the range card and hence across the cold junction compensation resistor 25.

Considering now the operation of the error detector 12 in conjunction with the thermocouple 10 and the range card 14, the input voltage signal developed by the thermocouple 10 and the cold junction compensation voltage developed across the resistor 25 are applied in series to the input coil 29 to produce a current flow through the input coil 29 on the beam 30 and through the feedback or rebalancing resistor 33. However, the resistor 33 is connected in series with the resistor 56 to the cathode circuit of the oscillator tube 40 so that oscillator output current also flows through the resistor 33 in the opposite direction from current flow produced in this resistor by the thermocouple input signal. Accordingly, the net voltage applied to the input coil 29 is the difference between the thermocouple voltage and the output voltage developed across the rebalancing resistor 33. A change in this difference voltage, such as would be produced by a change in the thermocouple temperature, is amplified in the error detector 12 so as to produce a change in output current flow through the resistor 33 in the proper direction to minimize this difference so that the output current is thereby adjusted to be proportional to the thermocouple input voltage. Accordingly, the thermocouple is only called upon to supply current to maintain the difference voltage at a level which, when amplified, yields the proper value of output current. Since the amplification within the error detector 12 is extremely high, the drain on the thermocouple is very low. However, since additional amplification may, in accordance with the present invention, be provided in the succeeding unit 15, a relatively low gain is required in the error detector unit 12. This means that the rebalancing of feedback resistor 33 may have a substantially larger value and hence provides more feedback so that the error detector 12 has a faster response characteristic. Also, with a reduced gain in the error detector unit 12 a higher resistance may be employed in the input circuit thereof which means that the leads from the thermocouple 10 to the error detector 12 may be substantially longer so that the thermocouple may be separated a substantial distance from the transmitting potentiometer itself without in any way affecting the sensitivity and accuracy of the potentiometer.

The intermediate direct current signal described above is derived from the resistor 56 and is supplied to the unit 15. More particularly, the voltage developed across the resistor 56 is supplied to an input coil 70 which is mounted on a pivotally supported beam 71, the coil 70 being positioned within a magnetic field developed by the magnetic structure 62. The other end of the beam 71 is positioned adjacent an oscillator coil 72 so that movement of the beam 71 produces a change in the inductance of the coil 72. The coil 72 is connected in series with the condensers 73 and 74 to form an oscillator tank circuit the voltage of which is coupled through the condenser 75 to the control grid of an oscillator tube 76. Alternating current developed across the winding 80 of the power transformer 45 is rectified by means of the rectifiers 81 and 82 and filtered across the filter condenser 83 to provide a unidirectional operating voltage which is supplied through the variable anode load inductance 84 to the anode of the oscillator tube 76. The oscillator tube 76 forms one arm of a Wheatstone bridge arrangement, the cathode resistor 85 of the tube 76 forming a second arm of this bridge. A pair of resistors 87 and 88, which form the other two arms of the bridge, are connected across the energizing potential developed by the condenser 83 and the equalizing terminals of the above described bridge circuit are connected to the output terminals 18 and 19 of the transmitting potentiometer.

In order to provide a range or span adjustment, while at the same time applying a rebalancing force to the beam 71 which will exactly balance torque exerted on the beam by the input coil 70 and the mechanical torque provided by the zero suppression facilities to be described in more detail hereinafter, a feedback coil 90 is also mounted on the beam 71 and is positioned in the air gap formed in the magnetic structure 62. A resistive shunt 91 is connected across the feedback coil 90 and the combination of the circuit elements 90 and 91 is connected in series with the resistors 92 and 93 and the range adjustment potentiometer 94 across the output terminals 18, 19, of the transmitting potentiometer. A capacitor 95 is connected across the resistors 92, 93 and the potentiometer 94 to bypass any alternating current components which may appear across these resistive components.

While the resistor 25 and its associated stabilized voltage supply which includes the voltage regulator tube 60 provides suitable cold junction compensation in the error detector unit 12, it is also necessary to provide zero suppression facilities so that the desired range of direct current transmission signals may be provided over any desired range of temperatures. In accordance with an important feature of the present invention, these zero suppression facilities are provided in the unit 15 by employing an arrangement wherein a torque is applied to the beam 71 in the unit 15 which opposes the input torque produced due to current flow through the input coil 70. More particularly, this zero suppression torque is provided mechanically by means of the coil spring 100, the spring 100 being adjustable by means of the zero suppression lever 101 so as to provide any desired zero suppression point with respect to which the direct current output signal provided at the terminals 18, 19 of the transmitting potentiometer will have its predetermined minimum value of one milliampere. By varying the zero suppression lever 101 the torque applied to the beam 71 to the spring 100 may be made to balance the input torque provided by the coil 70 at any desired temperature point and hence provide the necessary zero suppression for process control operation.

In calibrating the transmitting potentiometer of the present invention, the instrument is connected to a suitable alternating current source at the terminals 42, 43 thereof, the output terminals 18, 19 are connected to a suitable load simulating the transmission line and load of the process control system, or are short circuited, and the thermocouple input terminals 23, 24 are left open circuited. A voltmeter is placed across the check voltage standard terminals 102 and 103 to measure the voltage across the resistor 64 and the potentiometer 65 is adjusted so that the correct value of current flows through the resistor 25 to provide the desired cold junction compensation. This voltmeter is then connected to the check null terminals 104 and 105 to measure the voltage across the resistor 50 and the set null lever 106, which applies a mechanical torque to the beam 30 through the coil spring 107, is adjusted so that current flow through the resistor 50 is within the desired range of the intermediate direct current signal developed by the error detector unit 12. Preferably, the set null lever 106 is adjusted to the high current portion of this intermediate direct current signal so that in the event that the thermocouple leads are open circuited under operating conditions the transmitting potentiometer will go to full scale current output and hence provide a fail-safe type of operation for the transmitting potentiometer and the associated process control system.

A variable voltage source simulating the desired thermocouple span is then connected to the intput terminals 23, 24 and the input millivoltage of this source is set to the value at the lowest end of the desired span. The zero suppression lever 101 is then adjusted so that a current of one milliampere flows through the load circuit connected to the output terminals 18, 19. The simulated thermocouple voltage source is then set to an input millivoltage corresponding to the high end of the desired span, at which input the range adjustment potentiometer 94 is adjusted to provide an output at the terminals 18, 19 of five milliamperes. A check of the low end of the span may be made and readjustment of the zero suppression lever 101 may be necessary to provide complete calibration of the instrument, at which time it is ready for use in the process control system after replacing the simulated thermocouple voltage source by the thermocouple 10.

It will be noted that although the thermocouple 10 is electrically connected in the output circuit of the error detector unit 12, which provides the above described intermediate direct current signal, the thermocouple 10 is isolated from the final output terminals 18, 19 of the transmitting potentiometer by virtue of the fact that the output of the error detector unit 12 is supplied to the input coil 70 of the unit 15, which coil is itself isolated from the output terminals 18, 19. Accordingly, a ground on either one of the output terminals 18 or 19, which may occur either intentionally or accidentally in the other portions of the process control system, does not cause a ground to appear on either side of the thermocouple 10 and as this thermocouple is inserted into or withdrawn from the well 11 there is no possibility that an arc may be drawn between the thermocouple and the well which might produce an explosion in the process control area. It will also be noted that the unit 15, in addition to providing zero suppression facilities and range adjustment, may also provide substantial amplification of the intermediate direct current signal provided by the error detector unit 12. Accordingly, the amplification or gain provided in the error detector unit 12 may be substantially less than that required if the output of the error detector unit 12 is employed directly as the direct current output signal of the transmitting potentiometer. This means that the feedback resistor 33 may be of substantially increased value so that substantial additional negative feedback is provided for the electromechanical force balance unit in the error detector 12 with the result that faster response to changes in the thermocouple voltage is provided and, furthermore, a higher resistance in the input circuit, i.e., longer leads to the thermocouple 10, may be employed while providing the necessary sensitivity and accuracy of the potentiometer. Furthermore, since the output from the unit 12, which is supplied to the input coil 70, is taken from the fedback circuit, a high output impedance is provided to the unit 15 so that a constant current type of operation is provided and hence temperature changes will have substantially little effect on the operation of the transmitting potentiometer as a whole.

While a particular embodiment of the invention has been shown, it will be understood, of course, that the invention is not limited thereto since many modifications may be made and it is therefore contemplated by the appended claims to cover any such modifications as fall within the true spirit and scope of the invention.

What is claimed as new and is desired to be secured by Letters Patent of the United States is:

1. A transmitting potentiometer, comprising a first electromechanical force balance unit having an input circuit and an output circuit, a primary measuring element for developing a direct current input signal proportional to a measured variable, a load resistor in series with the output of said first force balance unit, means connecting said primary measuring element, said load resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a work circuit, and means for supplying a direct current output signal to said work circuit from said oscillator.

2. A transmitting potentiometer, comprising a first electromechanical force balance unit having an input circuit and an output circuit, a primary measuring element for developing a direct current input signal proportional to a measured variable, a load resistor in series with the output of said first force balance unit, means connecting said primary measuring element, said load resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a work circuit, means for supplying a direct current output signal to said work circuit from said oscillator and zero suppression means for exerting an adjustable torque on said beam in opposition to the torque produced by said intermediate direct current signal.

3. A transmitting potentiometer, comprising a first electromechanical force balance unit having an input circuit and an output circuit, a primary measuring element for developing a direct current input signal proportional to a measured variable, a load resistor in series with the output of said first force balance unit, means connecting said primary measuring element, said load resistor and the input circuit of said first force balance unit in series circuit relation, currrent flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a work circuit, means for supplying a direct current output signal to said work circuit from said oscillator, mechanical means for exerting a torque on said beam in opposition to the torque produced by said intermediate direct current signal, and means for adjusting the torque exerted by said last named means to provide zero suppression for said direct current output signal.

4. A transmitting potentiometer, comprising a first electromechanical force balance unit having an input circuit and an output circuit, a primary measuring element for developing a direct current input signal proportional to a measured variable, a load resistor in series with the output of said first force balance unit, means connecting said primary measuring element, said load resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a feedback coil mounted on said beam and positioned in a magnetic field, and means for supplying a direct current output signal to said feedback coil and said work circuit, the current supplied to said feedback coil being of the correct polarity to produce a torque on said beam in opposition to the torque developed by said intermediate direct current signal.

5. A transmitting potentiometer, comprising a first electromechanical force balance unit having an input circuit and an output circuit, a primary measuring element for developing a direct current input signal proportional to a measured variable, a load resistor in series with the output of said first force balance unit, a cold junction compensating resistor, means for supplying a stabilized unidirectional voltage to said compensating resistor, means connecting said primary measuring element, said load resistor, said compensating resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a work circuit, and means for supplying a direct current output signal to said work circuit from said oscillator.

6. A transmitting potentiometer, comprising a first electromechanical force balance unit having an input circuit and an output circuit, a primary measuring element for developing a direct current input signal proportional to a measured variable, a load resistor in series with the output of said first force balance unit, a cold junction compensating resistor, means for supplying a stabilized unidirectional voltage to said compensating resistor, means connecting said primary measuring element, said load resistor, said compensating resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a work circuit, means for supplying a direct current output signal to said work circuit from said oscillator, and zero suppression means for exerting an adjustable torque on said beam in opposition to the torque produced by said intermediate direct current signal.

7. A transmitting potentiometer, comprising a first electromechanical force balance unit having an input circuit and an output circuit, a primary measuring element for developing a direct current input signal proportional to a measured variable, a load resistor in series with the output of said first force balance unit, a cold junction compensating resistor, means for supplying a stabilized unidirectional voltage to said compensating resistor, means connecting said primary measuring element, said load resistor, said compensating resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam an influenced by movement thereof, a work circuit, means for supplying a direct current output signal to said work circuit from said oscillator, mechanical means for exerting a torque on said beam in opposition to the torque produced by said intermediate direct current signal, and means for adjusting the torque exerted by said last named means to provide zero suppression for said direct current output signal.

8. A transmitting potentiometer, comprising a first electromechanical force balance unit having an input circuit and an output circuit, a primary measuring element for developing a direct current input signal proportional to a measured variable, a load resistor in series with the output of said first force balance unit, a cold junction compensating resistor, means for supplying a stabilized unidirectional voltage to said compensating resistor, means connecting said primary measuring element, said load resistor, said compensating resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a bridge circuit having a pair of output terminals and including said oscillator as an element thereof, a work circuit, variable resistance span adjusting means, and means connecting said work circuit and said span adjusting means across said bridge output terminals.

9. A transmitting potentiometer, comprising a first electromechanical force balance unit having an input circuit and an output circuit, a primary measuring element for developing a direct current input signal proportional to a measured variable, a load resistor in series with the output of said first force balance unit, a cold junction compensating resistor, means for supplying a stabilized unidirectional voltage to said compensating resistor, means connecting said primary measuring element, said load resistor, said compensating resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a bridge circuit having a pair of output terminals and including said oscillator as an element thereof, a work circuit, variable resistance span adjusting means, means connecting said work circuit and said span adjusting means across said bridge output terminals, and zero suppression means for exerting an adjustable torque on said beam in opposition to the torque produced by said intermediate direct current signal.

10. A transmitting potentiometer, comprising a first electromechanical force balance unit having an input circuit and an output circuit, a primary measuring element for developing a direct current input signal proportional to a measured variable, a load resistor in series with the output of said first force balance unit, a cold junction compensating resistor, means for supplying a stabilized unidirectional voltage to said compensating resistor, means connecting said primary measuring element, said load resistor, said compensating resistor and the input circuit of said first force balance unit in series circuit relation, current flow through said load resistor as a result of said input signal being in the opposite direction from said output circuit current, a second electromechanical force balance unit including a pivotally mounted beam, an input coil mounted on said beam and positioned in a magnetic field, means for supplying an intermediate direct current signal to said input coil which is proportional to the output circuit current of said first force balance unit, thereby to exert a torque on said beam proportional to said intermediate direct current signal, an electrical oscillator including a tuning coil positioned adjacent said beam and influenced by movement thereof, a bridge circuit having a pair of output terminals and including said oscillator as an element thereof, a feedback coil mounted on said beam and positioned in a magnetic field, variable resistance span adjusting means, means connecting said feedback coil and said span adjusting means in series across said bridge output terminals, a work circuit, and means connecting said work circuit across said bridge output terminals.

No references cited.